United States Patent [19]
Johno et al.

[11] Patent Number: 5,352,382
[45] Date of Patent: Oct. 4, 1994

[54] LIQUID CRYSTAL COMPOSITION

[75] Inventors: Masahiro Johno, Tsukuba; Tomoyuki Yui, Nagareyama; Yoshihisa Arai, Tsukuba, all of Japan

[73] Assignee: Mitsubishi Gas Chemical Co., Inc., Tokyo, Japan

[21] Appl. No.: 893,548

[22] Filed: Jun. 4, 1992

[30] Foreign Application Priority Data

Jun. 4, 1991 [JP] Japan ................... 3-159614

[51] Int. Cl.$^5$ .................. C09K 19/12; C09K 19/20
[52] U.S. Cl. ................ 252/299.65; 252/299.01; 252/299.64; 252/299.66; 252/299.67
[58] Field of Search .......... 252/299.01, 299.2, 295.64, 252/299.65, 299.66, 299.67, 299.5; 359/104

[56] References Cited

U.S. PATENT DOCUMENTS

| | | | |
|---|---|---|---|
| 5,078,477 | 1/1992 | Jono et al. | 359/91 |
| 5,108,650 | 4/1992 | Koden et al. | 252/299.01 |

FOREIGN PATENT DOCUMENTS

| | | |
|---|---|---|
| 0350330 | 10/1990 | European Pat. Off. |
| 0422613 | 4/1991 | European Pat. Off. |
| 0422996 | 4/1991 | European Pat. Off. |

OTHER PUBLICATIONS

Chemical Abstracts, vol. 109, 1988, Columbus, Ohio, US; abstract no. 14938T, 'ferroelectric liquid crystal material for electrooptical matrix display' p. 571.

*Primary Examiner*—Shean Wu
*Attorney, Agent, or Firm*—Sherman and Shalloway

[57] ABSTRACT

Antiferroelectric liquid crystal composition comprising at least one of antiferroelectric liquid crystal substances, and at least one of optically active substances.

8 Claims, No Drawings

LIQUID CRYSTAL COMPOSITION

DETAILED DESCRIPTION OF THE INVENTION

The present invention relates to a novel antiferroelectric liquid crystal composition. More specifically, it relates to an antiferroelectric liquid crystal composition which forms an antiferroelectric phase in a temperature range Including room temperature.

A liquid crystal display device has been so far used in various small-size display devices due to its low-voltage operability, low power consumption and display capability with a thin screen. With a recent increase in application and use of a liquid crystal device to/in an information or office automation equipment field or a television field, there are rapidly increasing demands for high-efficiency large-scale liquid crystal display devices having a larger display capacity and a higher display quality than those of conventional CRT display devices. However, as far as a presently available nematic liquid crystal is used, even an active matrix-driven liquid crystal display device which is generally used for a liquid crystal display television finds it difficult to increase its size and decrease its production cost since the production process is complicated and the yield is low. Further, even in a simple matrix-driven STN type liquid crystal display device, the driving of a display having a large capacity is not necessarily easy, the response time is also limited, and it Is difficult to display motion images. In a practical sense, therefore, a nematic liquid crystal display device cannot be said to satisfy the above demands for a high-efficiency large-scale liquid crystal display device.

Under the circumstances, a liquid crystal display device using an antiferroelectric liquid crystal substance is drawing attention as a high-speed liquid crystal display device. A surface stabilized ferroelectric liquid crystal (SSFLC) device disclosed by Clark and Lagerwal is attracting attention to its unprecedented high speed of response and wide visual angel. Its switching characteristics have been studied in detail, and there have been produced many ferroelectric liquid crystal substances which can be applied to SSFLC devices. However, SSFLC devices to which these ferroelectric liquid crystal substances are applied have not yet been actually put to practical use for a variety of reasons: (1) The threshold characteristics are insufficient. (2) The contrast is inferior due to the chevron structure of the liquid crystal layer. (3) It is difficult to realize a high speed or response. (4) It is not easy to realize bistability which is one of the greatest characteristics of SSFLC due to difficulty to control the liquid crystal molecule alignment. (5) When the liquid crystal molecule alignment is broken by a mechanical shock, it is difficult to restore the alignment. Separately, the development of devices having a different switching mechanism from that of SSFLC devices is also under way. Switching of a liquid crystal substance having an antiferroelectric phase (hereinafter to be referred to as "antiferroelectric liquid crystal substance") among tristable states is one of the new switching mechanisms (Japanese Journal of Applied Physics, vol. 27, pp. L729, 1988).

An antiferroelectric liquid crystal substance has three stable states, and its first feature is a switching among tristable states. The second feature of the antiferroelectric liquid crystal substance is that it has a clear threshold to an applied voltage. Further, the antiferroelectric liquid crystal substance has memory capability, which is its third feature. By taking advantage of such excellent characteristic features of an antiferroelectric liquid crystal substance, there can be produced a liquid crystal display device which shows a high speed of response and an excellent contrast.

Another great feature is that the layer structure of an antiferroelectric liquid crystal substance can easily undergo switching by the application of an electric field. Due to this feature, there can be produced a liquid crystal device which has extremely little defect and shows self-restoration of its alignment, which therefore shows excellent contrast.

Antiferroelectric liquid crystal substances have been already known by Japanese Laid-open Patent Publications Nos. 213390/1989, 31633/1989, 316367/1989, 6372/1989 and 28128/1990 and Liquid Crystals, Vo. 6, pp. 167, 1989.

However, from the viewpoint of practical use, most of antiferroelectric liquid crystal substances which have been already known and manufactured have too high melting points, and the temperature at which to form an antiferroelectric phase is higher than room temperature to a great extent. It is therefore difficult to produce a liquid crystal device from only one kind of antiferroelectric liquid crystal substance. As a result, it is generally required to use two or more other liquid crystal substances in combination with one or more antiferroelectric liquid crystal substances in order to keep the same balance of the properties of the device as that of other liquid crystal device. In the above use in combination, usually, a more or less satisfactory result can be obtained concerning the decrease in the melting point and the expanding of the temperature range, in which an antiferroelectric phase is formed, to about room temperature. However, undesirable results often consequently occur such as a decrease in the tilt angle and a decrease in speed of response.

Therefore, it is an object of the present invention to provide a novel antiferroelectric liquid crystal composition.

It is another object of the present invention to provide an antiferroelectric liquid crystal composition which shows a lowered melting point and forms an antiferroelectric phase in a temperature range including room temperature.

It is further another object of the present invention to provide a specific organic compound as a constituent component for an antiferroelectric liquid crystal composition, which gives the antiferroelectric liquid crystal composition of the present invention having the above-described performances when mixed with specific antiferroelectric liquid crystal substance(s).

It is still further another object of the present invention to provide an antiferroelectric liquid crystal composition which shows the above excellent performances and which hardly influence other desirable properties of an antiferroelectric liquid crystal substance, such as a tilt angle and speed of response.

Other objects and advantages of the present invention will be apparent from the following description.

According to the present invention, the above objects and advantages of the present invention are achieved by an antiferroelectric liquid crystal composition comprising:

at least one of antiferroelectric liquid crystal substances of the formula (1),

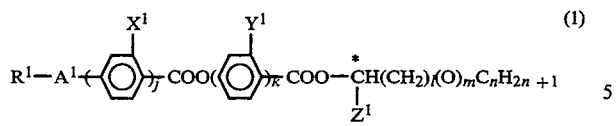 (1)

wherein $R^1$ is a linear alkyl group, $A^1$ is —O— or a single bond, each of $X^1$ and $Y^1$ is, independently of other, H or F, $Z^1$ is —$CH_3$, —$CF_3$ or —$C_2H_5$, each of j and k is, independently of other, 1 or 2 providing at least one of j and k is 2, , l is 0 or an integer of 5 or more, m is 0 or 1, and n is an integer of 1 or more, and at least one of optically active substances of the formula (2),

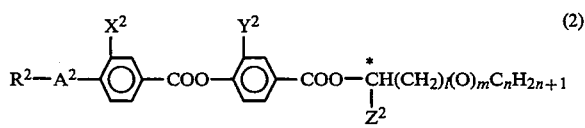 (2)

wherein $R^2$ is a linear alkyl group, $A^2$ is —O— or a single bond, each of $X^2$ and $Y^2$ is, independently of other, H or F, $Z^2$ is —$CH_3$ or —$CF_3$, l is 0 or an integer of 5 or more, m is 0 or 1, and n is an Integer of 1 or more, provided that l is 0 when $Z^2$ is —$CH_3$ or an integer of 5 or more when $Z^2$ is —$CF_3$ and m is 0 when $Z^2$ is —$CH_3$ or 1 when $Z^2$ is —$CF_3$.

The antiferroelectric liquid crystal substance used in the present invention has the above formula (1).

In the formula (1), $R^1$ Is a linear alkyl group, and the alkyl group preferably has 6 to 14 carbon atoms.

$A^1$, $X^1$, $Y^1$, $Z^1$, j, k, l, m and n are as defined above. When l is an integer of 5 or more, the integer is preferably 5 to 8. The subindex, n, which is an integer of 1 or more, is preferably 1 to 8.

Specific examples of the compounds of the above formula (1) are apparent from the above definitions, and, for example, a compound of the following formula is given. Therefore the description of many examples is omitted.

The compounds of the formula (1) can be produced, for example, by the following method, which is disclosed by the present inventors in co-pending Japanese Patent Applications Nos. 314,306/1990 and 332,462/1990.

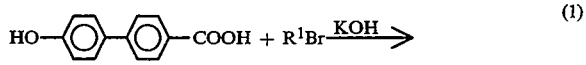 (1)

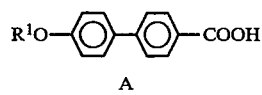

A

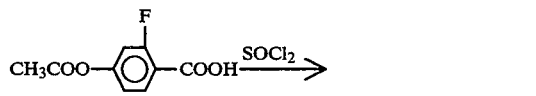 (2)

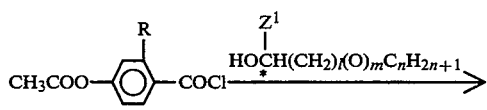

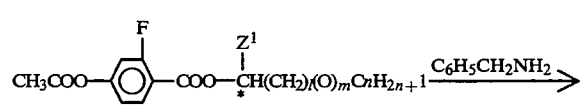

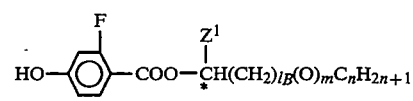

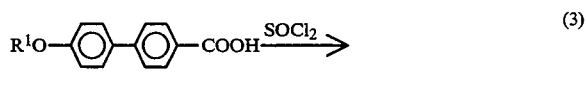 (3)

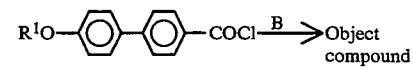

Further, 4-acetoxy-2-fluorobenzoic acid used as a starting material in the above step (2) can be produced by a known reaction, for example, according to the following method using m-fluorophenol as a starting material.

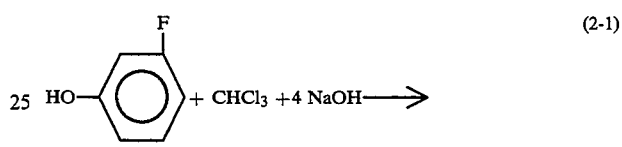 (2-1)

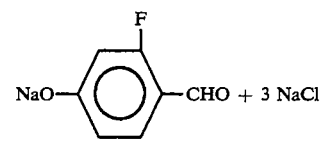

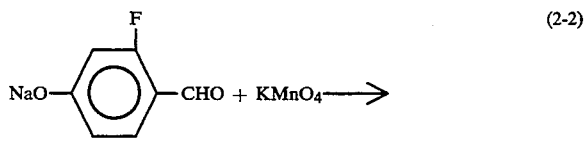 (2-2)

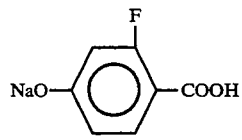

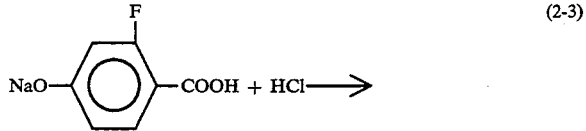 (2-3)

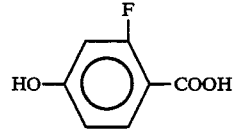

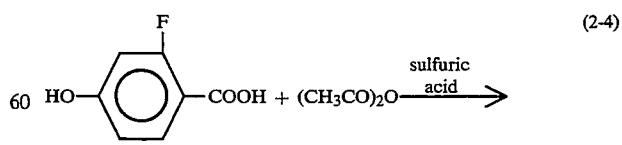 (2-4)

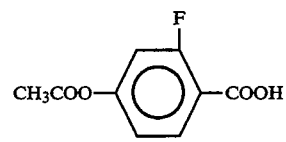

The optically active substances, as the other component of the composition of the present invention, have the formula (2).

In the formula (2), $R^2$ is a linear alkyl group, and the alkyl group preferably has 6 to 10 carbon atoms.

$A^2$, $X^2$, $Y^2$, $Z^2$, l, m and n are as defined above. When l is an integer of 5 or more, the integer is preferably 5 to 8. The subindex, n, which is an integer of 1 or more, is preferably 1 to 6. The numbers of l and m are determined depending upon the definition of $Z^2$. When $Z^2$ is $CH_3$, l and m is 0. When $Z^2$ is $CF_3$, l is an integer of 5 or more, and m is 1.

Specific examples of the optically active compounds of the formula (2) are also apparent from the above definitions for the above formula (2). Therefore, the description thereof is omitted.

The compounds of the above formula (2) can be also produced by the same method as that for the production of the compounds of the formula (1).

That is, in the above method for producing the compounds of the formula (1), the compound A is replaced with a compound A' of the following formula,

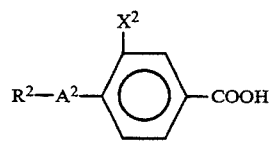

and the compound B is replaced with a compound B' of the following formula.

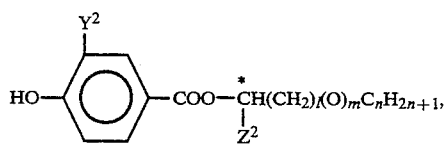

whereby the compounds of the formula (2) can be similarly produced.

The compounds of the formula (1) used in the present invention show antiferroelectric properties, while the compounds of the formula (2) are optically active substances but do not even show a liquid crystal phase. Further, the compounds of the formula (2) are oily substances which do not undergo crystallization even at a temperature of $-20°$ C. or lower. Naturally, therefore, the properties inherent to an antiferroelectric liquid crystal substance such as a tilt angle and optical response are not observed in the compounds of the formula (2). When the compounds of the formula (2) having such properties are incorporated into the compounds of the formula (1), it is generally supposed that one compound from the compounds of the formula (1) or a mixture of the compounds of the formula (1) loses its antiferroelectric phase or that its tilt angle and speed of response decrease. However, the present inventors have found the following facts. When the amount of the compound(s) of the formula (2) is set in a predetermined range, that is, when the amount of the compound(s) of the formula (2) based on the compounds of the formula (1) or a mixture thereof is not more than 30 mol %, preferably 5 to 20 mol %, particularly preferably about 10 mol %, unanticipated results can be obtained. That is, the decrease in the melting point and the expanding of the temperature range, in which an antiferroelectric phase is formed, toward about room temperature can be simply achieved without decreasing the tilt angle of the compounds of the formula (1) or a mixture thereof and without decreasing the speed of response of the compounds of the formula (1) or a mixture thereof. When the compound(s) of the formula (2) is (are) mixed with one compound from the compounds of the formula (1) or a mixture thereof in such a proportion that the amount of the compound(s) of the formula (2) based on the compound(s) of the formula (1) exceeds 30 mol %, the alignment of the liquid crystal molecule tends to deteriorate. At the same time, the resultant composition shows undesirable defects in that the presence of part of an isotropic phase is observed even around room temperature, and the tilt angle decreases.

The novel antiferroelectric liquid crystal composition of the present invention has a low melting point and a wide temperature range in which an antiferroelectric phase is formed. And, due to its characteristic features such as high speed of response, switching among tristable states, clear threshold properties and excellent memory capability, it can be used for the production of a liquid crystal display device excellent in practical use.

The present invention will be described hereinafter by reference to Examples, Comparative Example and Referential Example. However, the present invention shall not be limited to the Examples.

REFERENTIAL EXAMPLE 1

A liquid crystal substance (E) having the following chemical structure,

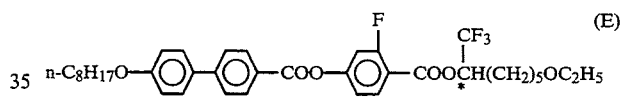

and a liquid crystal substance (F) having the following chemical structure,

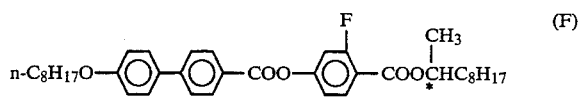

were mixed in predetermined amounts to prepare a liquid crystal composition. The liquid crystal composition was measured for its properties to show the following results. The phase sequence was determined on the basis of DSC and the observation of a texture. The speed of response and tilt angle were measured by closing the liquid crystal composition in an electrode cell having a thickness of 3 μm and sealing it. In tills case, the speed of response was measured at 30° C. and at an applied voltage of 17.5 V/μm.

(1) Liquid crystal composition a mixture of (E) 60 mol % and (F) 40 mol %

(2) Phase sequence, melting point, response speed and tilt angle of liquid crystal composition (i) Phase sequence:

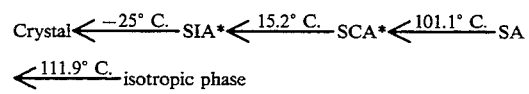

SIA* means an antiferroelectric smectic I phase.
SCA* means an anti ferroelectric smectic C phase.
SA means a smectic A phase.

(ii) Melting point: −25° C. or lower (iii) Speed of response: 48 μsec (transition from anti ferroelectric phase to ferroelectric phase)

(iv) Tilt angle: 33°

The liquid crystal composition had excellent physical property values. However, the temperature range in which the antiferroelectric phase was formed shifted to the high-temperature range from 15° C. to 101° C.

EXAMPLE 1

An oily, optically active substance (G) having the following chemical structure,

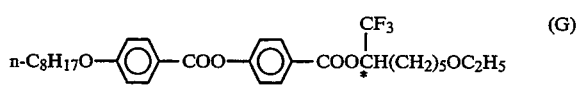

was mixed with the composition prepared in Referential Example 1, and the resultant composition was measured for physical properties in the same manner as in Referential Example 1. The results were as follows.

(1) Liquid crystal composition a mixture of (E) 54 mol %, (F) 36 mol % and (G) mol %.

(2) Phase sequence, melting point, response speed and tilt angle of liquid crystal composition (1) Phase sequence:

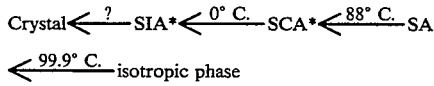

(ii) Melting point: −25° C. or lower (iii) Speed of response: 45 μsec (transition from anti-ferroelectric phase to ferroelectric phase)

(iv) Tilt angle: 32°

As the result of incorporation of 10 mol % of the oily substance (G) Into the composition prepared in Referential Example 1, the lower limit of the temperature range in which the antiferroelectric phase was formed was expanded to 0° C., while the speed of response and the tilt angle remained in the values of the composition of Referential Example 1.

EXAMPLE 2

An oily, optically active substance (H) having the following chemical structure,

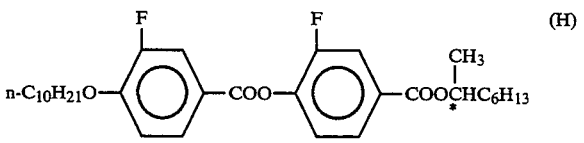

was mixed with the composition prepared in Referential Example 1, and the resultant composition was measured for physical properties in the same manner as in Referential Example 1. The results were as follows.

(1) Liquid crystal composition a mixture of (E) 54 mol %, (F) 36 mol % and (H) 10 mol %.

(2) Phase sequence, melting point, response speed and tilt angle of liquid crystal composition

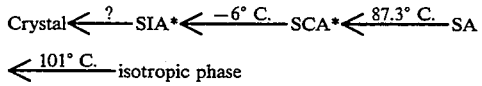

(ii) Melting point: −25° C. or lower (iii) Speed of response: 41 μsec (transition from anti-ferroelectric phase to ferroelectric phase)

(iv) Tilt angle: 30°

As the result of Incorporation of 10 mol % of the oily substance (H) Into the composition prepared in Referential Example 1, the lower limit of the temperature range in which the antiferroelectric phase was formed was expanded to −6° C., while the speed of response and the tilt angle remained in the values of the composition of Referential Example 1.

What is claimed is:

1. An antiferroelectric liquid crystal composition comprising
    at least one of antiferroelectric liquid crystal substances of the formula (1),

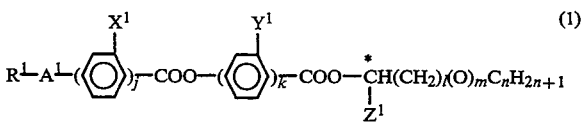

wherein $R^1$ is a linear alkyl group having 6 to 14 carbon atoms, $A^1$ is —O— or a single bond, each of $X^1$ and $Y^1$ is, independently of each other, H or F, $Z^1$ is —$CH_3$, —$CF_3$ or —$C_2H_5$, each of j and k is, independently of each other, 1 or 2, providing at least one of j and k is 2, l is 0 or an integer of 5 to 8, m is 0 or 1, and n is an integer of 1 to 8, and at least one of optically active substances of the formula (2),

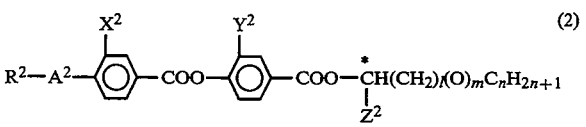

wherein $R^2$ is a linear alkyl group, $A^2$ is —O— or a single bond, each of $X^2$ and $Y^2$ is, independently of each other, H or F, $Z^2$ is —$CH_3$ or —$CF_3$, l is 0 or an integer of 5 to 8, m is 0 or 1, and n is an integer of 1 to 6, provided that l is 0 when $Z^2$ is —$CH_3$ or an integer of 5 to 8 when $Z^2$ is —$CF_3$ and m is 0 when $Z^2$ is —$CH_3$ or 1 when $Z^2$ is —$CF_3$, wherein at least one of the optically active substances of the formula (2) is contained in an amount of not more than 30 mol % based on the total amount of at least one of the liquid crystal substances of the formula (1) and at least one of the optically active substances of the formula (2).

2. An antiferroelectric liquid crystal composition according to claim 1 wherein at least one of the optically active substances of the formula (2) is contained in an amount of 5 to 20 mol % based on the total amount of at least one of the liquid crystal substances of the formula (1) and at least one of the optically active substances of the formula (2).

3. An antiferroelectric liquid crystal composition comprising:

at least one of antiferroelectric liquid crystal substances of the formula (1),

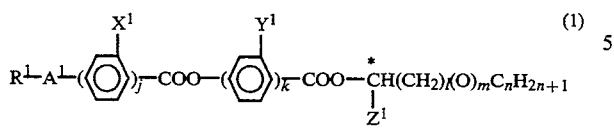

wherein $R^1$ is a linear alkyl group having 6 to 14 carbon atoms, $A^1$ is —O— or a single bond, each of $X^1$ and $Y^1$ is, independently of each other, H or F, $Z^1$ is —$CH_3$, —$CF_3$ or —$C_2H_5$, each of j and k is, independently of each other, 1 or 2, providing that at least one of j and k is 2, l is 0 or an integer of 5 to 8, m is 0 or 1, and n is an integer of 1 to 8, and at least one of optically active substances of the formula (2),

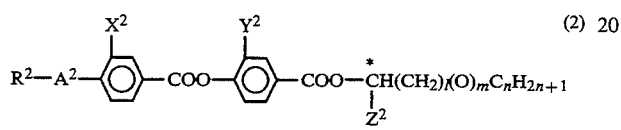

wherein $R^2$ is a linear alkyl group having 6 to 10 carbon atoms, $A^2$ is —O— or a single bond, each of $X^2$ and $Y^2$ is, independently of each other, H or F, $Z^2$ is —$CH_3$ or —$CF_3$, l is 0 or an integer of 5 to 8, m is 0 or 1, and n is an integer of 1 to 6, provided that l is 0 when $Z_2$ is —$CH_3$ or an integer of 5 to 8 when $Z^2$ is —$CF_3$ and m is 0 when $Z^2$ is —$CH_3$ or 1 when $Z^2$ is —$CF_3$, wherein at least one of the optically active substances of the formula (2) is contained in an amount of 5 to 30 mol % based on the total amount of at least one of the liquid crystal substances of the formula (1) and at least one of the optically active substances of the formula (2).

4. An antiferroelectric liquid crystal composition comprising:

at least one of antiferroelectric liquid crystal substances of the formula (1),

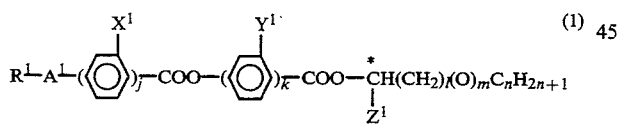

wherein $R^1$ is a linear alkyl group having 6 to 14 carbon atoms, $A^1$ is —O— or a single bond, each of $X^1$ and $Y^1$ is, independently of each other, H or F, $Z^1$ is —$CH_3$, —$CF_3$ or —$C_2H_5$, each of j and k is, independently of each other, 1 or 2, providing at least one of j and k is 2, l is 0 or an integer of 5 to 8, m is 0 or 1, and n is an integer of 1 to 8, and at least one of optically active substances of the formula (2),

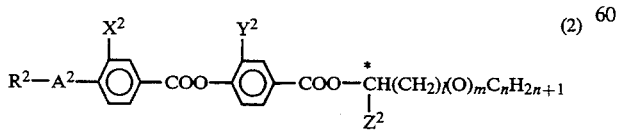

wherein $R^2$ is a linear alkyl group having 6 to 10 carbon atoms, $A^2$ is —O— or a single bond, each of $X^2$ and $Y^2$ is, independently of each other, H or F, $Z^2$ is —$CH_3$, l is 0, m is 0, and n is an integer of 1 to 6, wherein at least one of the optically active substances of the formula (2) is contained in an amount of 5 to 20 mol % based on the total amount of at least one of the liquid crystal substances of the formula (1) and at least one of the optically active substances of the formula (2).

5. An antiferroelectric liquid crystal composition according to claim 3 wherein at least one of the optically active substances of the formula (2) is contained in an amount of about 10 mol % based on the total amount of at least one of the liquid crystal substances of the formula (1) and at least one of the optically active substances of the formula (2).

6. An antiferroelectric liquid crystal composition comprising:

at least one of antiferroelectric liquid crystal substances of the formula (1),

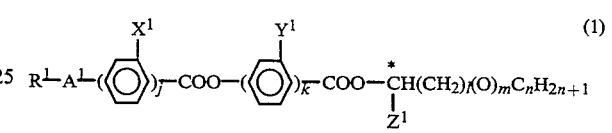

wherein $R^1$ is a linear alkyl group having 6 to 14 carbon atoms, $A^1$ is —O— or a single bond, each of $X^1$ and $Y^1$ is, independently of each other, H or F, $Z^1$ is —$CH_3$, —$CF_3$ or —$C_2H_5$, each of j and k is, independently of each other, 1 or 2, providing that at least one of j and k is 2, l is 0 or an integer of 5 to 8, m is 0 or 1, and n is an integer of 1 to 8, and at least one of optically active substances of the formula (2),

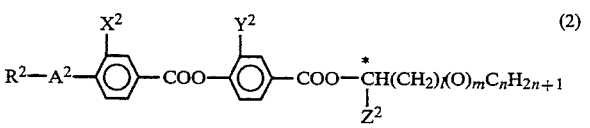

wherein $R^2$ is a linear alkyl group having 6 to 10 carbon atoms, $A^2$ is —O— or a single bond, each of $X^2$ and $Y^2$ is, independently of each other, H or F, $Z^2$ is —$CF_3$, l is an integer of 5 to 8, m is 1, and n is an integer of 1 to 6, wherein at least one of the optically active substances of the formula (2) is contained in an amount of 5 to 20 mol % based on the total amount of at least one of the liquid crystal substances of the formula (1) and at least one of the optically active substances of the formula (2).

7. An antiferroelectric liquid crystal composition according to claim 6 wherein at least one of the optically active substances of the formula (2) is contained in an amount of about 10 mol % based on the total amount of at least one of the liquid crystal substances of the formula (1) and at least one of the optically active substances of the formula (2).

8. An antiferroelectric liquid crystal composition comprising an antiferroelectric liquid crystal substance which is a member selected from the group consisting of

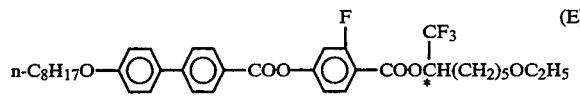

(E)

and

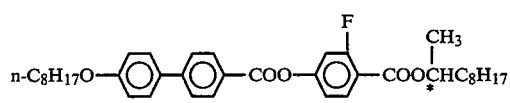

(F)

and mixtures thereof, and an optically active substance which is a member selected from the group consisting of

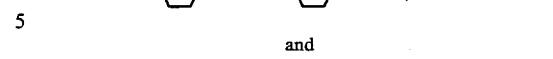

(G)

and

(H)

and mixtures thereof,
wherein at least one of the optically active substances (G) and (H) is contained in an amount of 5 to 30 mol % based on the total amount of at least one of the liquid crystal substances (E) and (F) and at least one of the optically active substances (G) and (H).

* * * * *